United States Patent
Wu et al.

(10) Patent No.: US 9,054,984 B2
(45) Date of Patent: Jun. 9, 2015

(54) METHOD, SWITCHING DEVICE AND SYSTEM FOR ENABLING MULTICAST FORWARDING

(71) Applicant: Huawei Technologies Co., Ltd., Shenzhen, Guangdong (CN)

(72) Inventors: Di Wu, Shenzhen (CN); Fenghua Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 189 days.

(21) Appl. No.: 13/647,896

(22) Filed: Oct. 9, 2012

(65) Prior Publication Data
US 2013/0028255 A1  Jan. 31, 2013

Related U.S. Application Data

(63) Continuation of application No. PCT/CN2011/072758, filed on Apr. 14, 2011.

(30) Foreign Application Priority Data
Apr. 16, 2010  (CN) .......................... 2010 1 0148630

(51) Int. Cl.
| H04L 12/28 | (2006.01) |
| H04L 12/761 | (2013.01) |
| H04L 12/931 | (2013.01) |
| H04L 12/705 | (2013.01) |

(52) U.S. Cl.
CPC .............. *H04L 45/16* (2013.01); *H04L 49/201* (2013.01); *H04L 45/18* (2013.01)

(58) Field of Classification Search
CPC ........ H04L 45/16; H04L 45/18; H04L 49/201
USPC .......................................................... 370/390
See application file for complete search history.

(56) References Cited

U.S. PATENT DOCUMENTS

| 6,977,891 B1 | 12/2005 | Ranjan et al. |
| 7,646,713 B1 | 1/2010 | Absillis et al. |

(Continued)

FOREIGN PATENT DOCUMENTS

| CN | 1852231 A | 10/2006 |
| CN | 1852249 A | 10/2006 |

(Continued)

OTHER PUBLICATIONS

Extended European Search Report in corresponding European Patent Application No. 11768435.7 (Apr. 23, 2013).

(Continued)

*Primary Examiner* — Paul H Masur
(74) *Attorney, Agent, or Firm* — Leydig, Voit & Mayer, Ltd.

(57) ABSTRACT

A method for enabling multicast forwarding relates to the field of IP communication technologies. The method for enabling multicast forwarding implements flexible networking and enables proper function of the multicast proxy. A switch device receives a multicast protocol message; the switch device determines a sender of the multicast protocol message according to a port from which the multicast protocol message is received; the switch device transmits the multicast protocol message transparently if the sender of the multicast protocol message is a routing device or a switching device, and the switch device terminates the multicast protocol message according to a multicast proxy function if the sender of the multicast protocol message is a host of a multicast user.

5 Claims, 4 Drawing Sheets

(56) References Cited

U.S. PATENT DOCUMENTS

| | | |
|---|---|---|
| 2005/0249208 A1 | 11/2005 | Kim |
| 2006/0153219 A1 | 7/2006 | Wong et al. |
| 2008/0123647 A1 | 5/2008 | Chen et al. |
| 2010/0272106 A1* | 10/2010 | Pan .............................. 370/390 |
| 2011/0249551 A1* | 10/2011 | Rollins ......................... 370/222 |
| 2011/0310896 A1* | 12/2011 | Cheng et al. .................. 370/390 |

FOREIGN PATENT DOCUMENTS

| | | |
|---|---|---|
| CN | 1988464 A | 6/2007 |
| CN | 101060465 A | 10/2007 |
| CN | 101409704 A | 4/2009 |
| CN | 101459595 A | 6/2009 |
| EP | 2139159 A1 | 12/2009 |
| WO | WO 2007/031880 A2 | 3/2007 |

OTHER PUBLICATIONS

Gupta et al., "Implementation of IGMP and MLD Proxy-Reporting Switches," Jan. 2005, IETF, Fremont, California.

Wing, D., "IGMP Proxy Behavior," Feb. 15, 2006, The Internet Society, Reston, Virginia.

Fenner et al., "Internet Group Management Protocol (IGMP)/Multicast Listener Discovery (MLD)-Based Multicast Forwarding," Aug. 2006, The Internet Society, Reston Virginia.

1st Office Action in corresponding Chinese Patent Application No. 201010148630.5 (Jun. 5, 2013).

International Search Report in corresponding International Patent Application No. PCT/CN2011/072758 (Jul. 21, 2011).

Written Opinion of the International Searching Authority in corresponding International Patent Application No. PCT/CN2011/072758 (Jul. 21, 2011).

Fenner et al., "RFC-4605—Internet Group Management Protocol (IGMP) / Multicast Listener Discovery (MLD)-Based Multicast Forwarding ("IGMP/MLD Proxying")," Aug. 2006, The Internet Society, Reston, Virginia.

Gupta et al., "Implementation of IGMP and MLD Proxy-Reporting Switches," Jul. 2004, Internet Engineering Task Force, Fremont, California.

Wing, "IGMP Proxy Behavior," Feb. 15, 2006, The Internet Society, Reston, Virginia.

* cited by examiner under the routing device. In this way, the multicast proxy function is enabled correctly in the layer-2 network that
US 9,054,984 B2
METHOD, SWITCHING DEVICE AND SYSTEM FOR ENABLING MULTICAST FORWARDING

CROSS-REFERENCE TO RELATED APPLICATIONS

This application is a continuation of International Patent Application No. PCT/CN2011/072758, filed on Apr. 14, 2011, which claims priority to Chinese Patent Application No. 201010148630.5, filed on Apr. 16, 2010. The contents of the above identified applications are hereby incorporated herein by reference in their entirety.

FIELD OF THE TECHNOLOGY

The present invention relates to the field of IP communication technologies and, in particular, to a method, a switching device and a system for enabling multicast forwarding.

BACKGROUND OF THE INVENTION

In a simple network of a tree topology, multicast group information may be learned and forwarded through an Internet Group Management Protocol (IGMP) and an IGMP Proxy function. By deploying the IGMP Proxy function, the overhead of the protocol messages is reduced effectively, and the bandwidth is saved. However, a precondition of using the IGMP Proxy is that the network has a tree topology, in which a clear upstream and downstream relationship exists between devices.

Daisy chain networking is a semi-ring network formed by splicing pseudo wires (PWs) in a hierarchical virtual private LAN service (H-VPLS) mode. As shown in FIG. 1, through protocol independent multicast (PIM), a designated routing device is elected among the routing devices M and N on the top. For example, the routing device M is elected for forwarding multicast data. The switching devices A, B, and C below enable IGMP Snooping and IGMP Proxy to forward multicast data to terminal users as required. In a ring network, the enabling of the IGMP Proxy leads to the following problem: Switching devices A and C are upstream devices of the switching device B, and also downstream devices of the switching device B; after receiving a Join message destined for 225.1.1.1 from the user, the switching device B sends the message to the switching devices A and C; the switching devices A and C also send the Join message destined for 225.1.1.1 to their respective upstream device, including the switching device B; consequently, the switching device B believes that three of its ports require the data of 225.1.1.1, but in fact, only one user requires the data.

A solution to the foregoing problem in the conventional art is to select a querier as a unique upstream device, such as routing device M, by means of IGMP querier election. Other devices meet the following logical relationships strictly: The switching device A is the upstream device of the switching device B, the switching device B is the upstream device of the switching device C, and the switching device C is the upstream device of the switching device D. In this way, the correct topology relationship is ensured between devices, and the IGMP Proxy function can be deployed normally. However, the solution in the conventional art strictly restricts that only one upstream device exists, and, once the ring network is faulty, protocol convergence needs to be performed again to set up a correct upstream and downstream relationship. For example, when the switching device B is faulty, the multicast service does not return to normal until the relationship ensuring the switching device D as an upstream device of the switching device C is set up again, which sacrifices the advantage of the ring network characterized by fast recovery from a fault.

SUMMARY OF THE INVENTION

Embodiments of the present invention provide a method, a switching device and a system for enabling multicast forwarding, with a view to enabling a multicast proxy function correctly, implementing flexible networking and ensuring the ring network advantage of fast recovery from a fault.

The method, switching device and system for enabling multicast forwarding in the embodiments of the present invention are based on the following technical solutions:

A method for enabling multicast forwarding includes:
receiving a multicast protocol message;
determining a sender of the multicast protocol message; and
transmitting the multicast protocol message transparently if the sender of the multicast protocol message is a routing device or switching device, or terminating the multicast protocol message according to a multicast proxy function if the sender of the multicast protocol message is a host of a multicast user.

A switching device includes a receiving unit, a determining unit, and a processing unit.

The receiving unit is configured to receive a multicast protocol message.

The determining unit is configured to determine a sender of the multicast protocol message.

The processing unit includes:
a transparently transmitting module, configured to transmit the multicast protocol message transparently if the sender of the multicast protocol message is a routing device or switching device; and
a terminating module, configured to terminate the multicast protocol message according to a multicast proxy function if the sender of the multicast protocol message is a host of a multicast user.

A system for enabling multicast forwarding includes: a switching device, a routing device, and a host of a multicast user. The switching device includes:
a receiving unit, configured to receive a multicast protocol message sent by the routing device, the host of the multicast user, or another switching device;
a determining unit, configured to determine a sender of the multicast protocol message; and
a processing unit, configured to transmit the multicast protocol message transparently if the sender of the multicast protocol message is the routing device or another switching device, or terminate the multicast protocol message according to a multicast proxy function if the sender of the multicast protocol message is the host of the multicast user.

Through the method, switching device and system for enabling multicast forwarding in the embodiments of the present invention, the switching device is logically set into two parts. Through a routing device port, one part connects the switching device to another switching device, and connects the switching device to a routing device, and this part transmits the multicast protocol message transparently; through a host port, the other part is connected to the host of the multicast user, and this part terminates the multicast protocol message, and the ring network is converted into a logical network in which the switching device is directly connected under the routing device. In this way, the multicast proxy function is enabled correctly in the layer-2 network that enables the multicast snooping, the networking is more flexible, and the ring network advantage of fast recovery from a fault is ensured.

BRIEF DESCRIPTION OF THE DRAWINGS

To describe the technical solution of the embodiments of the present invention or the prior art more clearly, the following outlines the accompanying drawings used in description of the embodiments of the present invention or the prior art. Apparently, the accompanying drawings are illustrative rather than exhaustive, and persons of ordinary skill in the art can derive other drawings from them without making any creative effort.

DETAILED DESCRIPTION OF THE EMBODIMENTS

The following detailed description of the technical solutions of embodiments of the present invention is given in conjunction with the accompanying drawings of the embodiments in order to provide a thorough understanding of the present invention. Evidently, the drawings and the detailed description are merely representative of particular embodiments of the present invention rather than all embodiments. All other embodiments, which can be derived by those skilled in the art from the embodiments of the present invention without making any creative effort, shall fall within the protection scope of the present invention.

Embodiments of the present invention provide a method, a switching device and a system for enabling multicast forwarding, with a view to enabling a multicast proxy function correctly and implementing flexible networking without compromising the ring network advantage of fast recovery from a fault.

Embodiment 1

In this embodiment of the present invention, the switching device is set into two parts logically. One part is composed of the routing device ports, and is designed to connect the switching device with another switching device, and connect the switching device with a layer-2 bridge device of the routing device, and this part transmits the multicast protocol message transparently. The other part is composed of host ports, and is designed to connect the layer-2 bridge device of the host of the multicast user, and this part intercepts a multicast protocol message, and generates a new multicast protocol message and sends it to an upstream device.

Figure 2:
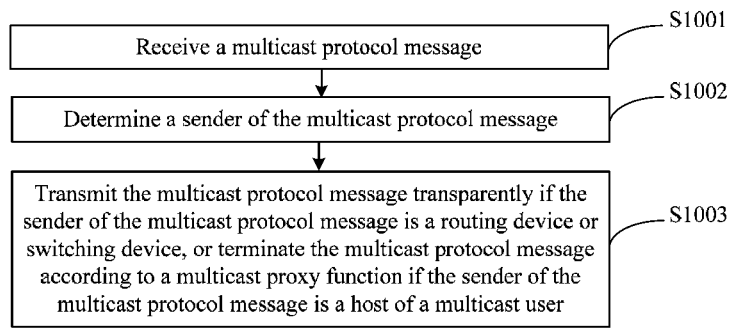
FIG. 2 is a flowchart of a method for enabling multicast forwarding according to a Embodiment 1 of the present invention.

This embodiment provides a method for enabling multicast forwarding. As shown in FIG. 2, the method includes:

Step S1001: Receive a multicast protocol message.

The switching device receives the multicast protocol message sent by the routing device, the host of the multicast user, or another switching device.

Step S1002: Determine a sender of the multicast protocol message.

For example, the switching device may determine the sender of the multicast protocol message according to the port from which the multicast protocol message is received.

Step S1003: Transmit the multicast protocol message transparently if the sender of the multicast protocol message is a routing device or switching device, or terminate the multicast protocol message according to a multicast proxy function if the sender of the multicast protocol message is a host of a multicast user.

The multicast proxy function is an IGMP Proxy function in an IGMP application network, or a Multicast Listener Discovery (MLD) Proxy function in an MLD application network.

Through the method for enabling multicast forwarding in this embodiment, the switching device transparently transmits the multicast protocol message received by the routing device or switching device to an upstream device, and terminates the multicast protocol message received by the host of the multicast user, and therefore, the ring network is converted to a logical network in which the switching device is directly connected under the routing device. In this way, the multicast proxy function is enabled correctly in the layer-2 network that enables the multicast snooping, the networking is more flexible, and the ring network advantage of fast recovery from the fault is ensured.

Embodiment 2

Figure 3:
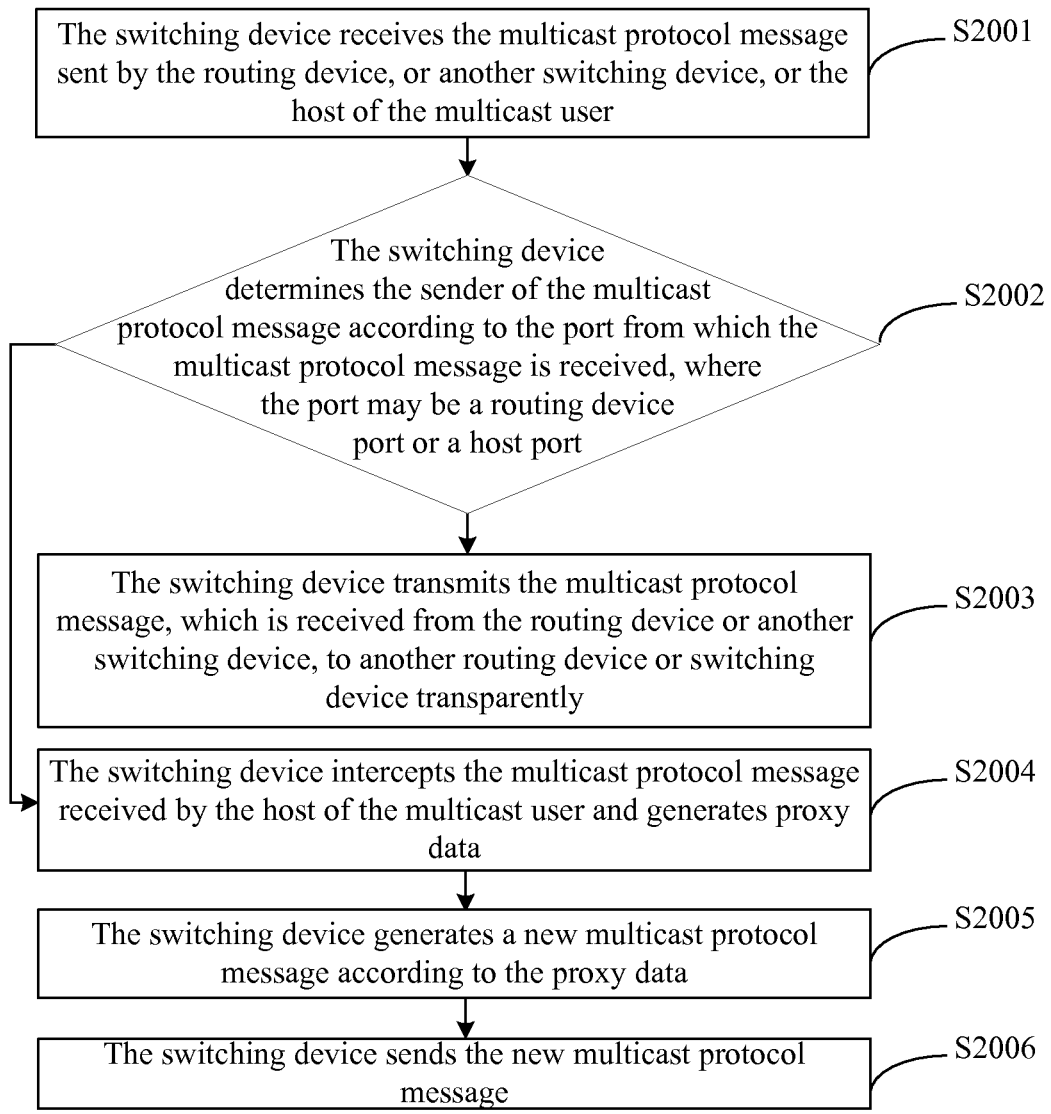
FIG. 3 is a flowchart of a method for enabling multicast forwarding according to a Embodiment 2 of the present invention.

This embodiment of the present invention provides a method for enabling multicast forwarding. As shown in FIG. 3, the method may include:

Step S2001: The switching device receives the multicast protocol message sent by the routing device, or another switching device, or the host of the multicast user.

For a switching device in the network, the received multicast protocol message may be sent by the routing device, or another switching device, or the host of the multicast user.

Step S2002: The switching device determines the sender of the multicast protocol message according to the port from which the multicast protocol message is received, where the port may be a routing device port or a host port.

The switching device judges the port from which the multicast protocol message is received. If the multicast protocol message is received through the routing device port, the switching device determines that the sender of the multicast protocol message is a routing device or another switching device, and performs step 2004; if the multicast protocol message is received through the host port, the switching device determines that the sender of the multicast protocol message is a host of a multicast user, and performs step 2003.

Step S2003: The switching device transmits the multicast protocol message, which is received from the routing device or another switching device, to another routing device or switching device transparently.

The switching device forwards the multicast protocol message, which is sent by the routing device or another switching device, to another routing device or switching device directly.

Step S2004: The switching device intercepts the multicast protocol message received by the host of the multicast user and generates proxy data.

The switching device terminates the multicast protocol message sent by the host of the multicast user according to a multicast proxy function. For example, supposing that the multicast proxy is an IGMP Proxy, the switching device uses the IGMP Proxy function to terminate the multicast protocol message if the switching device receives the multicast protocol message from the host of the multicast user through the host port.

Specifically, the switching device uses the IGMP Proxy function learns and distributes multicast group information. The switching device responsible for the IGMP Proxy function needs to intercept the IGMP message received from a downstream device, and maintain the IGMP group information data according to the received IGMP message, and generates the proxy data inclusive of the local multicast group information and performs step S2005 when:

a Join message is received and the message is the first Join information a Leave message is received and the message is the last Leave information;

a Group query message is received, and the corresponding multicast group information is stored locally; or a General Query message is received.

As described above, the switching device responsible for the IGMP Proxy function intercepts the IGMP message received from a downstream device, thereby participating in the setup of a multicast group. When a user request is submitted, the switching device responsible for the IGMP Proxy function checks local multicast group information first, and, if the multicast group exists locally, adds the user as a member into the multicast group, without sending a Join request to the upstream routing device; conversely, if the corresponding multicast group is not found locally, the switching device responsible for the IGMP Proxy function sends a request to the upstream routing device, and sets up a multicast group locally. When a multicast member requests to leave, the switching device responsible for the IGMP Proxy function checks whether another multicast member exists in the multicast group, and, if so, just deletes the member requesting to leave the multicast group; otherwise the switching device instructs an upstream routing device to revoke the multicast group.

That is, the switching device intercepts the IGMP message received from a downstream device, and generates the corresponding proxy data inclusive of the local multicast group information according to the Join message, Leave message, Group query message, and Group query message only when receiving the Join message, Leave message, Group query message, or Group query message.

Step S2005: The switching device generates a new multicast protocol message according to the proxy data.

The switching device generates a new multicast protocol message according to the proxy data that includes the local multicast group information. Specifically, in step 2004, if a received Join message is the first Join message, the switching device generates a multicast protocol message that includes Join information.

If a Leave message is received from a last user who leaves, the switching device generates a multicast protocol message that includes Leave information.

If a Group query message is received and the corresponding multicast group information exists locally, the switching device generates a multicast protocol message that includes Report information; and If a General Query message is received, the switching device generates a multicast protocol message that includes the local multicast group information.

Step S2006: The switching device sends the new multicast protocol message.

The switching device reports the new multicast protocol message, which is generated in step S2005, to its upstream devices (switching device and routing device).

The downstream device (switching device) responsible for the IGMP Proxy function terminates the IGMP protocol message, namely, intercepts the IGMP message received from the downstream device. Therefore, the downstream device sends an IGMP protocol message to the upstream device (switching device or routing device) only when receiving a Join message, Leave message, Group query message, or Group query message. To the upstream device, the directly connected users are reduced massively, and the IGMP protocol messages that need to be processed are reduced massively. The deployment of the IGMP Proxy function reduces the cost of the protocol messages effectively and saves bandwidth.

Through the method for enabling multicast forwarding in this embodiment of the present invention, the switching device transparently transmits a part of the multicast protocol messages received from the routing device or another switching device to another switching device and routing device, and terminates the multicast protocol message received from the host of the multicast user, namely, intercepts the multicast protocol message received by the host of the multicast user; generates new proxy data, generates a new multicast protocol message and sends it to an upstream device. Through such a setting, the ring network is converted to a logical network in which the switching device is directly connected under the routing device. In this way, the multicast proxy function is enabled correctly in the layer-2 network that enables the multicast snooping, the networking is more flexible, and the ring network advantage of fast recovery from the fault is ensured.

Embodiment 3

Figure 4:
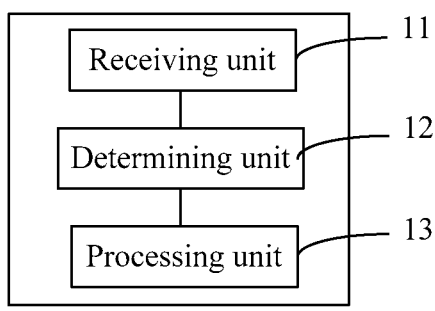
FIG. 4 is a schematic structural diagram of a switching device for enabling multicast forwarding according to a Embodiment 3 of the present invention.

This embodiment of the present invention provides a switching device for enabling multicast forwarding. As shown in FIG. 4, the switching device includes a receiving unit 11, a determining unit 12, and a processing unit 13.

The receiving unit 11 is configured to receive a multicast protocol message; the determining unit 12 is configured to determine a sender of the multicast protocol message; the processing unit 13 is configured to: transmit the multicast protocol message transparently if the sender of the multicast protocol message is a routing device or switching device, or terminate the multicast protocol message according to a multicast proxy function if the sender of the multicast protocol message is a host of a multicast user.

Further, the determining unit 12 is specifically configured to: determine that the sender of the multicast protocol message is a routing device or switching device if the multicast protocol message is received through a routing device port, or determine that the sender of the multicast protocol message is a host of a multicast user if the multicast protocol message is received through a host port.

The following describes the technical solution of this embodiment of the present invention, supposing that the multicast snooping is IGMP Snooping and the multicast proxy is IGMP Proxy.

Figure 5:
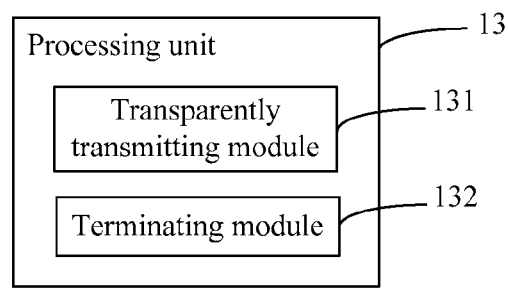
FIG. 5 is a schematic structural diagram of a processing unit of a switching device for enabling multicast forwarding according to a Embodiment 3 of the present invention.

As shown in FIG. 5, to ensure the IGMP Proxy function on a switching device that enables the IGMP Snooping, the processing unit 13 further includes a transparently transmitting module 131 and a terminating module 132.

The transparently transmitting module 131 is configured to transmit the multicast protocol message transparently if the sender of the multicast protocol message is a routing device or switching device; and the terminating module 132 is configured to terminate the multicast protocol message if the sender of the multicast protocol message is a host of a multicast user.

Figure 6:
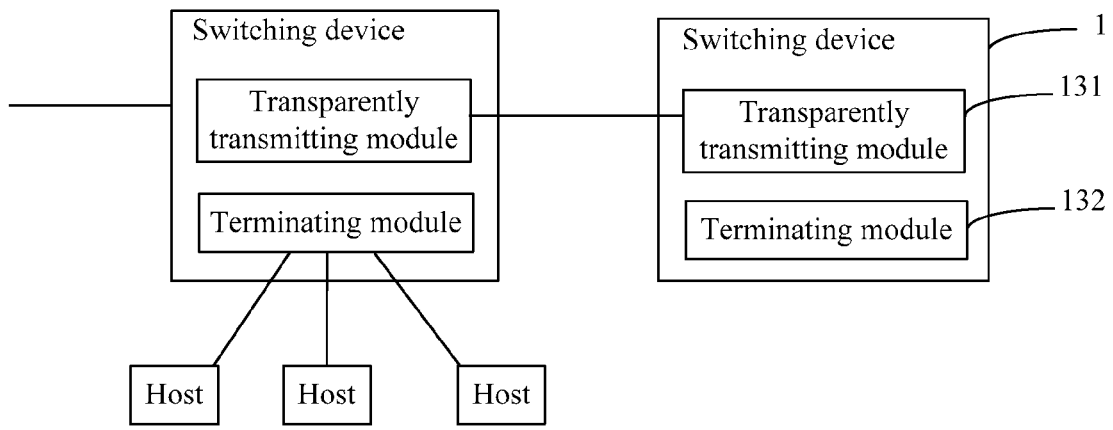
FIG. 6 is a schematic diagram of connection between a switching device for enabling multicast forwarding and another switching device according to a Embodiment 3 of the present invention.

That is, the switching device is logically divided into two parts. One part is composed of its routing device ports, and is designed to connect with another switching device and the routing device. The other part is composed of its host ports, and is designed to connect the host of the multicast user, as shown in FIG. 6. Specifically, the transparently transmitting module 131 is configured to transmit the IGMP protocol message to other routing device ports transparently; the terminating unit 132 is configured to enable the IGMP Proxy and terminate the IGMP proxy message. The terminating unit 132 specifically includes an intercepting and generating submodule, a generating submodule, and a sending submodule.

The intercepting and generating submodule is configured to intercept the multicast protocol message sent by the host of the multicast host, and generate proxy data according to the multicast protocol message sent by the host of the multicast user; the generating submodule is configured to generate a new multicast protocol message according to the proxy data; and the sending submodule is configured to send the new multicast protocol message.

Figure 1:
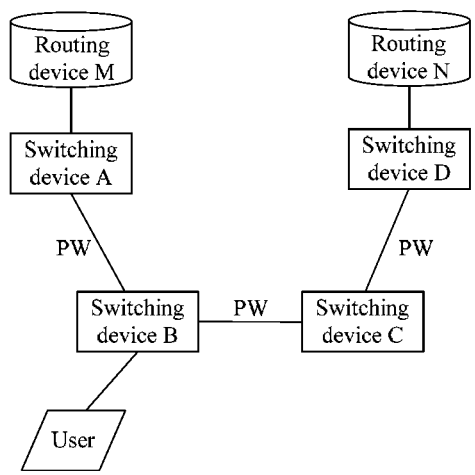
FIG. 1 is a schematic structural diagram of a daisy chain network in the prior art.
Figure 7:
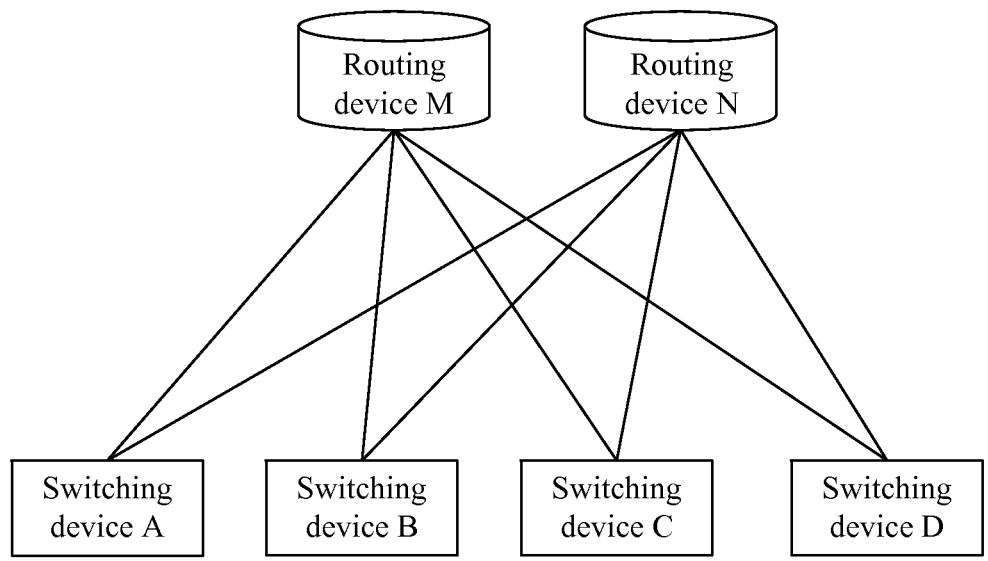
FIG. 7 is a schematic diagram of a logical network as a result of converting a ring network shown in FIG. 1 according to an embodiment of the present invention.

Because the transparently transmitting module 131 transparently transmits the IGMP protocol message to the upstream device directly without performing any other operation, the ring network in FIG. 1 may be logically converted into the networking mode shown in FIG. 7.

The converted topology ensures that the switching device is always a downstream device of the routing device, and no upstream-downstream relationship exists between the switching devices any more. In this way, it is appropriate to enable the IGMP Proxy on the switching device. Therefore, the action of enabling the IGMP Proxy on the switching device that enables the IGMP Snooping in this embodiment is as follows:

Perform proxy operation only for the Report/Leave message sent through ports other than routing device ports, namely, intercept the Report/Leave message sent through ports other than routing device ports, generate a proxy database (DB), and generate a new multicast protocol message according to the change of the DB and send the message to the upstream device, and answer a query message; for the Report/Leave message sent through the routing device port, forward the message to other routing device ports directly.

Through the device for enabling multicast forwarding in this embodiment, the switching device is logically set into two parts. Through a routing device port, one part connects the switching device to another switching device, and connects the switching device to a routing device, and this part transmits the IGMP protocol message transparently; through a host port, the other part is connected to the host of the multicast user, and this part terminates the IGMP protocol message, namely, intercepts the IGMP protocol message, generates a new Proxy DB and sends it to an upstream device. Such a setting converts the ring network into a logical network in which the switching device is directly connected under the routing device. In this way, the IGMP Proxy function is enabled correctly in the layer-2 network that enables the IGMP Snooping, the networking is more flexible, and the ring network advantage of fast recovery from the fault is ensured.

Embodiment 4

Figure 8:
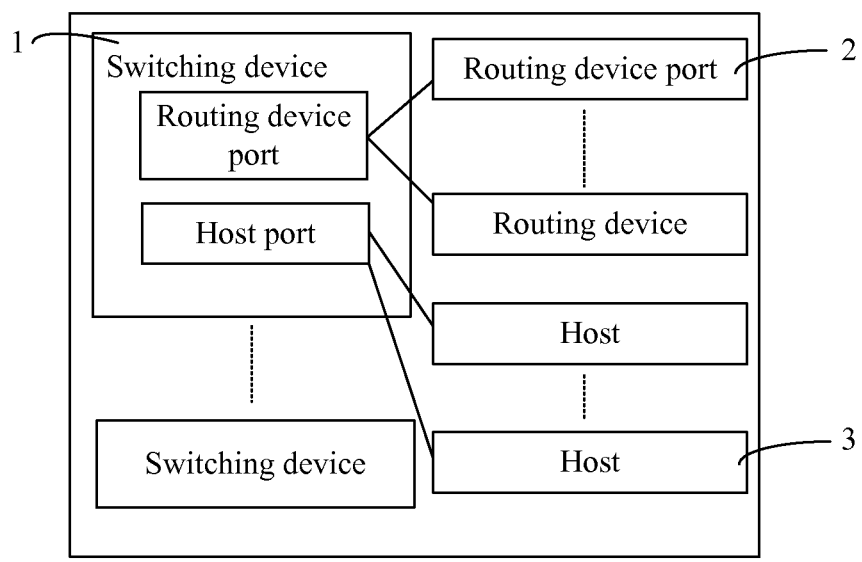
FIG. 8 is a schematic structural diagram of a system for enabling multicast forwarding according to a fourth embodiment of the present invention.

This embodiment provides a system for enabling multicast forwarding. As shown in FIG. 8, the system includes a switching device 1, a routing device 2, and a host 3 of a multicast user.

The switching device may be the switching device provided in embodiment 3. For example, the switching device may include a receiving unit 11, a determining unit 12, and a processing unit 13.

The receiving unit 11 is configured to receive a multicast protocol message sent by the routing device 2, the host 3 of the multicast user, or another switching device 1; the determining unit 12 is configured to determine a sender of the multicast protocol message; the processing unit 13 is configured to transmit the multicast protocol message transparently if the sender of the multicast protocol message is the routing device or another switching device, or terminate the multicast protocol message according to a multicast proxy function if the sender of the multicast protocol message is the host of the multicast user.

Further, the determining unit is specifically configured to: determine that the sender of the multicast protocol message is a routing device or switching device if the multicast protocol message is received through a routing device port, or determine that the sender of the multicast protocol message is a host of a multicast user if the multicast protocol message is received through a host port.

Through the system for enabling multicast forwarding in this embodiment of the present invention, the switching device is logically set into two parts. Through a routing device port, one part connects the switching device to another switching device, and connects the switching device to a routing device, and this part transmits the multicast protocol message transparently; through a host port, the other part is connected to the host of the multicast user, and this part terminates the multicast protocol message, namely, intercepts the multicast protocol message, generates new proxy data and sends it to an upstream device. Such a setting converts the ring network into a logical network in which the switching device is directly connected under the routing device. In this way, the multicast proxy function is enabled correctly in the layer-2 network that enables the multicast snooping, the networking is more flexible, and the ring network advantage of fast recovery from the fault is ensured.

Understandably, the technical solution of the present invention is applicable not only in a network that enables the IGMP Snooping function, but also in other networks such as an application network that enables MLD Snooping.

Persons of ordinary skill in the art would appreciate that the various illustrative units and algorithm steps described in connection with the embodiments disclosed herein may be implemented as electronic hardware, computer software, or a combination of both. To clearly illustrate this interchangeability of hardware and software, various illustrative components and steps have been described above generally in terms of their functionality. Whether such functionality is implemented as hardware or software depends upon the particular application of the technical solution and design constraints. Skilled artisans may implement the described functionality in varying ways for each particular application, but such implementation decisions should not be interpreted as causing a departure from the scope of the present information.

The steps of a method or algorithm described in connection with the embodiments disclosed herein may be embodied directly in hardware, in a software module executed by a processor, or in a combination of the two. The software module may reside in a random access memory (RAM), internal memory, read-only memory (ROM), electrically programmable ROM, electrically erasable programmable ROM, register, hard disk, removable disk, CD-ROM, or any other form of storage medium known in the art.

The above descriptions are merely preferred embodiments of the present invention, but not intended to limit the protection scope of the present invention. Any modifications, variations or replacement that can be easily derived by those skilled in the art without departing from the spirit of the present invention shall fall within the protection scope of the present invention. Therefore, the protection scope of the present invention is subject to the appended claims.

What is claimed is:

1. A method for enabling multicast forwarding, comprising:
   receiving, by a switching device, a multicast protocol message;
   determining, by the switching device, a sender of the multicast protocol message according to a port from which the multicast protocol message is received; and
   transmitting, by the switching device, the multicast protocol message transparently if the sender of the multicast protocol message is a routing device or a switching device, and terminating the multicast protocol message according to a multicast proxy function when the sender of the multicast protocol message is a host of a multicast user;
   wherein the determining the sender of the multicast protocol message according to the port from which the multicast protocol message is received comprises:
   determining that the sender of the multicast protocol message is the routine device or the switching device if the multicast protocol message is received through a routing device port or determining that the sender of the multicast protocol message is the host of the multicast user if the multicast protocol message is received through a host port.

2. The method according to claim 1, wherein the terminating the multicast protocol message according to the multicast proxy function comprises:
   intercepting the multicast protocol message sent by the host of the multicast user and generating proxy data;
   generating a new multicast protocol message according to the proxy data; and
   sending the new multicast protocol message.

3. A switching device for enabling multicast forwarding, comprising:
   a receiver configured to receive a multicast protocol message;
   a first processor, configured to determine a sender of the multicast protocol message according to a port from which the multicast protocol message is received; and
   a second processor, configured to transmit the multicast protocol message transparently when the sender of the multicast protocol message is a routing device or a switching device; and to terminate the multicast protocol message according to a multicast proxy function when the sender of the multicast protocol message is a host of a multicast user;
   wherein: the first processor is further configured to determine that the sender of the multicast protocol message is the routing device or the switching device if the multicast protocol message is received through a routing device port or determine that the sender of the multicast protocol message is the host of a multicast user if the multicast protocol message is received through a host port.

4. The switching device according to claim 3, wherein the second processor comprises:
   an intercepting and generating submodule configured to intercept the multicast protocol message sent by the host of the multicast user and generate proxy data;
   a generating submodule configured to generate a new multicast protocol message according to the proxy data; and
   a sending submodule, configured to send the new multicast protocol message.

5. A system for enabling multicast forwarding, comprising a switching device, a routing device, and a host of a multicast user, wherein the switching device comprises:
   a receiver, configured to receive a multicast protocol message sent by the routing device, the host of the multicast user, or another switching device; and
   a first processor, configured to determine a sender of the multicast protocol message according to a port from which the multicast protocol message is received,
   a second processor, configured to transmit the multicast protocol message transparently when the sender of the multicast protocol message is the routing device or the another switching device, and to terminate the multicast protocol message according to a multicast proxy function when the sender of the multicast protocol message is the host of the multicast user;
   wherein the first processor is further configured to: determine that the sender of the multicast protocol message is the routing device or the another switching device if the multicast protocol message is received through a routing device port or determine that the sender of the multicast protocol message is the host of the multicast user if the multicast protocol message is received through a host port.

* * * * *

UNITED STATES PATENT AND TRADEMARK OFFICE
CERTIFICATE OF CORRECTION

| | | |
|---|---|---|
| PATENT NO. | : 9,054,984 B2 | Page 1 of 1 |
| APPLICATION NO. | : 13/647896 | |
| DATED | : June 9, 2015 | |
| INVENTOR(S) | : Wu et al. | |

It is certified that error appears in the above-identified patent and that said Letters Patent is hereby corrected as shown below:

In the claims

Column 9, line 40, "routine" should read -- routing --.

Signed and Sealed this
Eighth Day of December, 2015

Michelle K. Lee
*Director of the United States Patent and Trademark Office*